April 4, 1950

J. B. THOMSON 2,503,009

BALL BEARING FOR LINEAR MOTION

Filed June 7, 1946

4 Sheets-Sheet 1

INVENTOR
JOHN B. THOMSON
BY
Emery, Varney, Whittemore & Dix
ATTORNEYS

April 4, 1950 J. B. THOMSON 2,503,009
BALL BEARING FOR LINEAR MOTION
Filed June 7, 1946 4 Sheets-Sheet 2
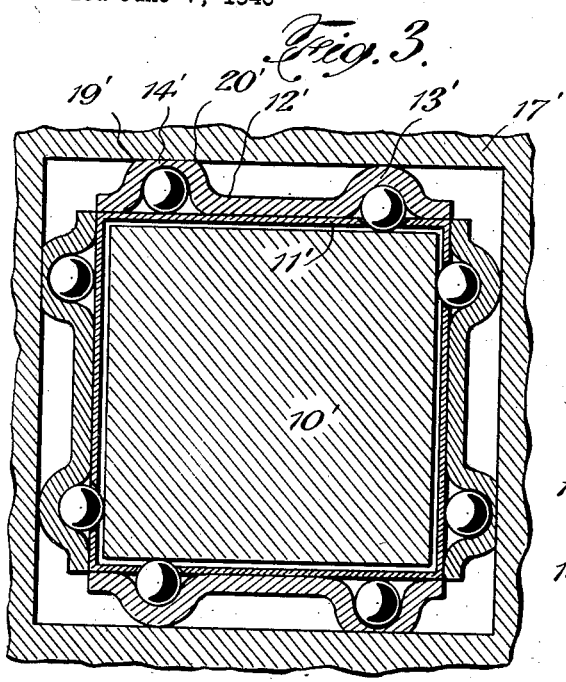
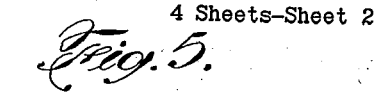
INVENTOR
JOHN B. THOMSON
BY
ATTORNEYS April 4, 1950 J. B. THOMSON 2,503,009
BALL BEARING FOR LINEAR MOTION
Filed June 7, 1946 4 Sheets-Sheet 3
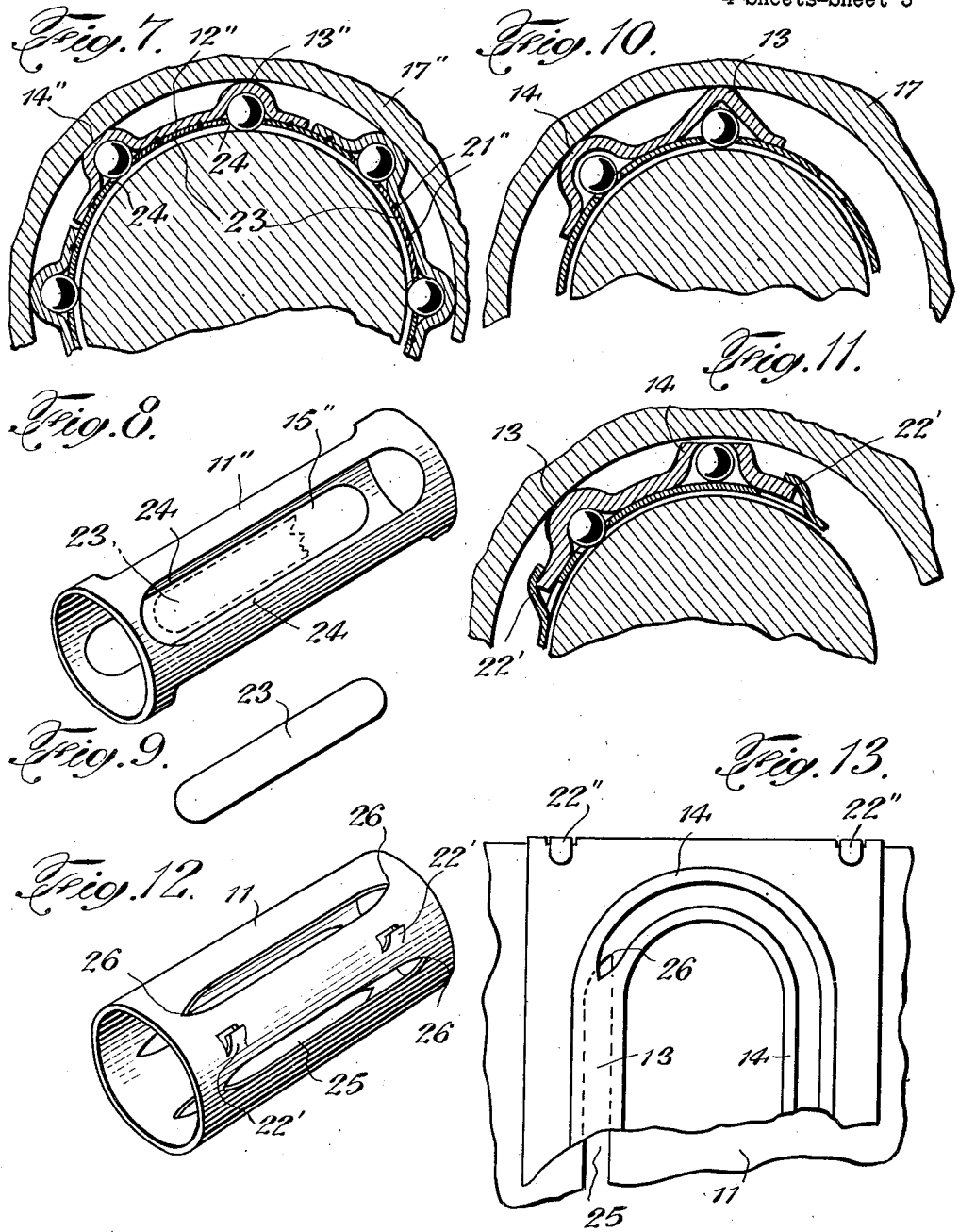
INVENTOR
JOHN B. THOMSON
BY
Emery, Varney, Whittemore & Dix
ATTORNEYS April 4, 1950  J. B. THOMSON  2,503,009
BALL BEARING FOR LINEAR MOTION Filed June 7, 1946  4 Sheets-Sheet 4

INVENTOR
JOHN B. THOMSON
BY
Emery, Varney, Whittemore & Dix
ATTORNEYS

Patented Apr. 4, 1950

2,503,009

UNITED STATES PATENT OFFICE 2,503,009

BALL BEARING FOR LINEAR MOTION

John B. Thomson, Plandome, N. Y.

Application June 7, 1946, Serial No. 675,248

11 Claims. (Cl. 308—6)

Ball bearings for linear motion in which the balls traverse continuous closed circuits have been proposed heretofore to meet the need for anti-friction sliding bearings, but have not gone into very wide general use largely because of the high manufacturing cost of the bearing designs offered to supply this need. This cost, in many cases where bearings of this type would have been of great utility, has been so excessive in comparison with the cost of plain sliding bearings, as to more than offset the advantages to be gained by their use.

In general, the high cost has been due to one or more of the following factors: (1) number of parts heretofore required to make up a bearign of this type many of which were small precision parts; (2) expensive methods of manufacture required, such as very accurate internal and external grinding, including the machining of areas of high-precision relief, fabrication of ball guiding and retaining parts many of which had to be made by hand or by superprecision machinery expensive to acquire; and (3) the amount of labor-time required to assemble the parts, insert the balls, fit their retainers into their proper places, and secure the assembled parts permanently in positive by screws and rivets.

The object of the present invention is to provide a ball bearing for linear moton the manufacture of which will be free or substantially free of the objections or defects enumerated above, all to the end of facilitating production and reducing the cost of manufacture.

In another patent application filed by me concurrently herewith Serial Number 675,247, filed June 7, 1946, I have illustrated and described other improvements in this type of bearing which still further promote the aforesaid objects.

Figure 1:
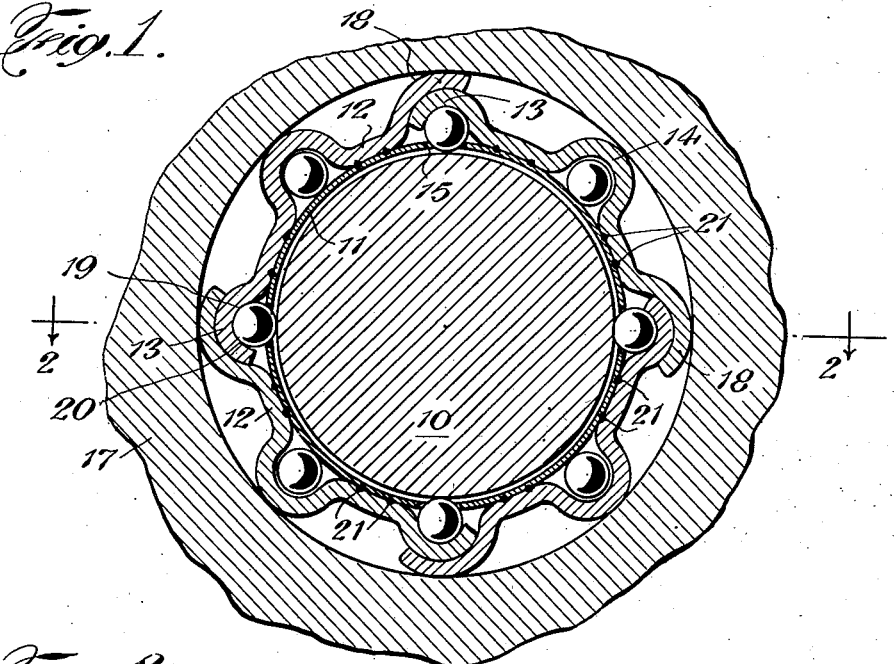
Figure 2:
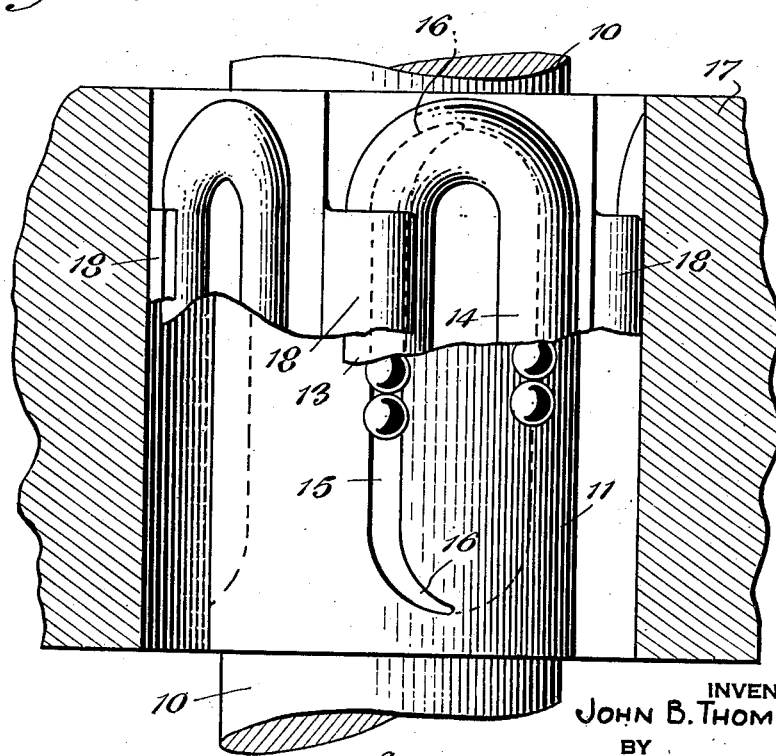
Figure 14:
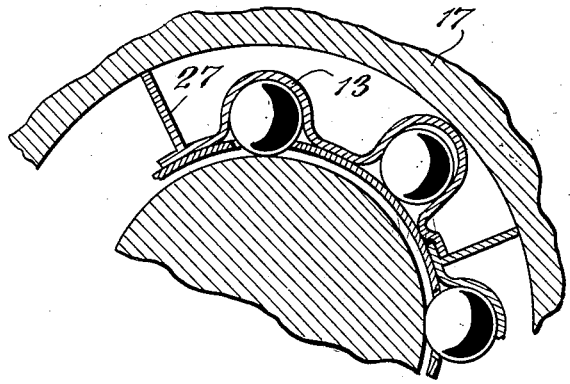
Figure 15:
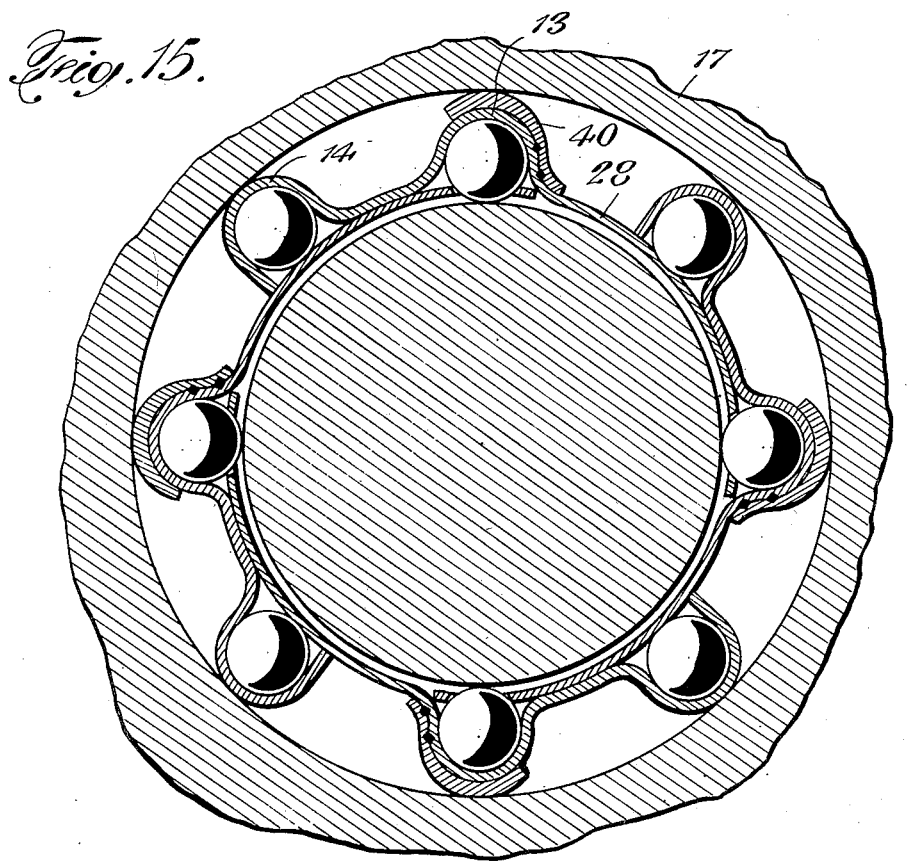

In the accompanying drawings which are illustrative of several embodiments of my present invention; Fig. 1 is a view in transverse section of one form of my bearing shown in its operative relation to a shaft upon which it is mounted and to an external housing within which it may be disposed; Fig. 2 is a view partly in elevation and partly in section as indicated by the line 2—2 of Fig. 1; Fig. 3 is a view similar to Fig. 1 of a form of my bearing for use with a rectangular shaft; Figs. 4 to 6 inclusive are detail views of some of the parts shown in Fig. 3; Figs. 7 to 9 inclusive are illustrative of another form of my bearing; Fig. 10 is illustrative of a modification which is applicable to any form of my bearing; Figs. 11 to 13 inclusive are illustrative of further modifications; Fig. 14 shows still another modification; and Fig. 15 is illustrative of another embodiment of my bearing.

In all of the embodiments or modifications illustrated in the drawings, the ball-race member (shown as comprising a number of separately formed sections which can readily be produced by stamping from sheets of a suitable bearing steel) has a plurality of continuous oblong ball raceways which overlie a sleeve surrounding the shaft and fitted thereto with a slight working tolerance, said sleeve having slots registering respectively with at least one of the straight portions of each raceway to permit the balls in those portions of the raceways to have bearing contact with the shaft. This sleeve, in each embodiment shown, except that of Fig. 15, is a separately-formed member but in all of said embodiments it coacts with the raceways to guide the balls and, in addition, serves as a ball retainer to hold the balls in the raceways at all times and under all conditions. As will be noted in the drawings, the raceways in all said embodiments, formed as they are by deformation of sheet metal, extend outwardly along the periphery of the bearing, that is, project beyond the undeformed parts of said metal. These raceways are substantially filled with balls which, in the particular straight portion of each raceway just alluded to (hereinafter referred to as the shallower or bearing portion thereof) have bearing contact with both the shaft and raceway, while in the other straight portion of each raceway (hereinafter referred to as the deeper or free-ball portion thereof) the balls are free to move in either direction as impelled by the balls which are in bearing contact.

Referring first to the embodiment of my invention shown in Figs. 1 and 2, where the shaft and sleeve are respectively marked 10 and 11 and the ball-race member comprises the separately-formed sections marked 12, the balls in the straight portion 13 of each raceway are in bearing contact and those in the other straight portion 14 of each raceway are free, that is, relieved of bearing contact, since the portion 13 of each raceway is made shallower than the portion 14. To permit the balls in all the shallower portions to have bearing contact with the shaft, the sleeve has longitudinal slots 15 registering respectively with those portions of the raceways, and said slots are preferably curved at each end 16 (to conform to the curvature of the ends of the oblong raceways) and their sides may converge at each end, as shown, so that said slots terminate about midway of the curved end portions of the raceways. Due to the converging ends of the slots, the balls are lifted from bearing contact with the shaft as they pass from the shallower portions of the raceways to the deeper portions thereof, the inner faces of the shallower and deeper portions of the raceways gradually blending into each other at the curved ends of the raceways. To take the thrust of the balls in the shallower portions of the raceways, the bearing may be fitted into a cylindrical opening of a housing 17; and the shallower straight portion 13 of each raceway may be overlapped by the edge 18 of an adjacent race member section 12, thereby adding to the exterior face of each said raceway portion 13 a sufficient thickness of material so that it will abut against the interior face of the housing. The exterior faces of all the overlapping edge portions 18 of the race member sections are desirably the same radial distance from the axis of the bearing as the exterior faces of the raceway portions 14. To give the balls which are in bearing contact with the shaft a substantial bearing contact with the raceways (in order to reduce wear and prolong the life of the bearing) the bearing faces of the shallower portions of the raceways may be formed so that the contour of any transverse section of said faces substantially matches that of the balls, as indicated between the points 19 and 20 in Fig. 1. With respect to the slots 15 in the sleeve 11, it will be understood that these slots are desirably made narrower than the diameter of the balls so that the sleeve will serve as a retainer for the balls. It will also be understood that the several sections 12 of the ball-race member may be and preferably are welded or otherwise secured to the sleeve 11, as indicated by heavy dots 21 in Fig. 1.

Referring to Figs. 3 to 6 inclusive where an embodiment of my bearing is shown as applicable to a rectangular shaft, such as 10', the sleeve 11' has a rectangular shape conforming to that of the shaft and each flat face of the sleeve is overlapped by a section 12' of the race member and may be welded, or otherwise secured, thereto. For this purpose tabs 22 may be formed on the ends of the sleeve and bent over the corresponding ends of the race member sections as shown in Fig. 4. Each race member section, as before, has formed therein a single continuous oblong raceway having its portions 13', in which the balls have bearing contact with both the shaft and raceway, shallower than its straight portion 14' in which the balls are free; and the sleeve has longitudinal slots 15' therein registering with the shallower portions 13' of the raceways and which slots may have curved converging ends 16' (Fig. 4) like the curved ends 16 of the slots 15 in Fig. 2, which curved ends serve the same purpose as before, namely, to lift the balls from the shaft to the exterior surface of the sleeve as they pass from the sleeve to the deeper portions of the raceways. In this embodiment, the walls of the shallower portions of the ball raceways may be thinned and flattened (as shown between the points 19' and 20' in Fig. 3 and in the top plan and end views of one of the race member sections of Figs. 5 and 6) so that when the bearing, for example, is disposed in a rectangular opening of a housing 17' the exterior faces of all of the raceways may abut against the interior face of the housing whereby the housing will take the thrust of the balls in the shallower portions of the raceways. Obviously, each race-member section may have more than one raceway; and in that case the raceways may be so disposed that balls in bearing contact with the shaft may be provided along each corner of the rectangular shaft, instead of along alternate corners as shown in Fig. 3.

Referring to the embodiment shown in Figs. 7 to 9 inclusive, the sleeve 11'' (shown in perspective in Fig. 8 but on a smaller scale than that of Fig. 7) is formed with relatively wide oblong slots 15'' each of which is spanned by the corresponding race-member section 12''; and a separately formed piece 23 (Fig. 9) is secured to the inner face of each race-member section to cooperate with the sleeve in retaining the balls in their raceways. These members 23 have the same shape as the slots 15'' but are narrower and shorter; and when the bearing is assembled, they are disposed respectively within the slots so as to be concentric therewith and provide with the sleeve what are, in effect, a plurality of continuous oval-shaped slots 24 for guiding and retaining the balls. Each raceway, as in the case of the embodiments previously described, is oblong and one of its straight portions 13'' is shallower than the other straight portion 14'' and abuts against the internal face of the housing 17'' but, due to the oval-shaped slots 24, the balls, as they pass from the shallower portions of the raceways to the deeper portions, are not lifted from the shaft to the exterior of the sleeve, as in the case of the previously described embodiments of my bearing. But it is of course obvious that, if desired, the portions of the slots 24 which register with the deeper portions of the raceways may be made narrower than the other portions so that the balls, as before, will have no contact with the shaft while they are traversing the deeper portions of the raceways. The heavy dots 21'' in Fig. 7 denote that the race member sections may be welded or otherwise secured to the sleeve and to the separately-formed pieces 23.

Fig. 10 illustrates a modification of the contours of the interior and exterior faces of the portions 13 of the raceways in which the balls have bearing contact with both the shaft and raceways. I have referred above to these portions of the raceways as the "shallower portions" and by this expression I mean to denote that these portions are either of a limited depth or else are so formed that the balls therein are forced or held in bearing contact with the shaft and cannot become free balls so long as they remain in these portions of the raceways. Accordingly, wherever the expression "shallower portions" is used anywhere in this specification or in the claims, I wish it to be interpreted in this broad sense. In this sense, the raceway portion 13 of the single race member section shown in Fig. 10 is shallower than the other portion 14 of that raceway, since a ball in the portion 14 can move away from the shaft and become a free ball, while a ball in the portion 13 is forced and held in bearing contact with the shaft by the angular shape of that portion, as shown in Fig. 10. This angular shape may be used in lieu of the rounded shape for any of the "shallower portions" of the ball-races described anywhere herein, and particularly where it is desired that these portions shall abut against an exterior housing, as 17, without the addition of an overlap as 18 in Fig. 1 or a separately-formed piece such as 40 in Fig. 15. The construction of my bearing shown in Fig. 10 may in other respects be the same as that of Figs. 7 to 9 inclusive, for example.

In the embodiment illustrated in Figs. 11 to 13 inclusive, the free ball portions 14 of the raceways have sufficient material removed from their exterior faces so as to leave these portions of the raceways open at their extreme outer ends, as shown in Fig. 11 and in the broken top plan view of Fig. 13. This permits the exterior faces of the shallower portions 13 of the raceways to abut against the interior face of the housing 17. The sleeve 11 of this embodiment has tabs 22′ and 22″ formed thereon which, in assembling the bearing, are bent over to secure the respective race member sections 12 to the sleeve. The slots 25 in the sleeve which are straight register respectively with the shallower portions 13 of the raceways and have converging ends 26 to lift the balls from the shaft, as before, when they pass from the portions 13 of the raceways and become free balls.

Fig. 14 illustrates a modification of the race member sections which are shown here as formed with a bent-up edge 27 adjacent to the shallower portion 13 of the raceway in each section. The end of this bent-up portion abuts against the exterior housing 17 to transmit the thrust of the bearing balls to said housing.

In the embodiment of my invention illustrated in Figs. 1 to 14 inclusive, no section of the ball-race member is formed integrally with any sleeve section. Since I do not wish to limit my invention in that respect, I have shown in Fig. 15 one way of constructing my bearing so that each sleeve section may constitute an integral part of a race member section. In this figure, each race member section comprises one complete raceway 13—14 and a sleeve extension 28, and these sections, in the assembled bearing, are so disposed in relation to each other that the raceway 13—14 formed in one section overlaps the sleeve extension 28 of an adjacent section. As here shown, the shallower or bearing portion 13 of the raceway in each section lies between the sleeve extension 28 of that section and the deeper or free ball portion 14 of said raceway. A separate piece 40 may be welded to the exterior surface of the portion 13 of each raceway for contact with the interior face of the housing 17 whereby the latter will take the thrust of the bearing balls.

I claim as my invention:

1. A ball-bearing for linear motion comprising, for combination with a shaft, a sleeve to receive the shaft, a ball-race member of sheet metal overlying the sleeve and deformed to provide a plurality of continuous oblong raceways extending outwardly beyond the undeformed portions of said metal, said raceways being disposed with their straight portions longitudinal of the bearing, and one of the straight portions of each raceway being shallower than the other straight portion, and said sleeve having slots registering respectively with the raceways to permit the balls in said shallower straight portions to have bearing contact with the shaft, and balls substantially filling the raceways and of such diameter that those in said shallower straight portions will have bearing contact with the raceways and the shaft.

2. A ball-bearing for linear motion comprising, for combination with a shaft, a sleeve to receive the shaft, a ball-race member of sheet metal overlying the sleeve and deformed to provide a plurality of continuous oblong raceways extending outwardly beyond the undeformed portions of said metal, said raceways being disposed with their straight portions longitudinal of the bearing, and one of the straight portions of each raceway being shallower than the other straight portion, and said sleeve having slots registering respectively with the shallower straight portions of the raceways to permit the balls in said shallower straight portions to have bearing contact with the shaft, and balls substantially filling the raceways and of such diameter that those in said shallower straight portions will have bearing contact with the raceways and the shaft.

3. The bearing defined in claim 1 and further characterized by this: this the shallower portion of each raceway gradually blends into its deeper portion at each curved end of the raceway, that each slot in the sleeve consists of a straight portion registering with the shallower straight portion of the corresponding raceway and curved end portions registering with the curved portions of the raceway, and that the sides of the end portions of each slot converge so as to lift the balls from bearing contact with the shaft as they pass from the shallower portion of each raceway.

4. The bearing defined in claim 1 and further characterized by this: that the contour of any transverse section of the bearing face of the shallower straight portion of each raceway substantially matches that of the balls.

5. The bearing defined in claim 1 and further characterized by this: that the slots in the sleeve are narrower than the diameter of the balls whereby the sleeve also serves as a ball-retainer to maintain the balls in their operative position in the raceways at all times and under all conditions.

6. The bearing defined in claim 1 and further characterized by this: that the ball-race member is made in sections each of which is secured to the sleeve and has at least one complete continuous ball raceway formed therein.

7. The bearing defined in claim 1 and further characterized by this: that the ball-race member is made in sections each of which has at least one complete continuous ball raceway formed therein, and that the sleeve has bent over projections to secure each section of the ball-race member thereto.

8. The bearing defined in claim 1 in combination with a hollow housing and further characterized by this: that the ball-race member is made in sections each of which has formed therein at least one continuous ball raceway and bears against the interior face of the housing at a point or points on the ball-race member adjacent to the shallower straight portion of the raceway.

9. The bearing defined in claim 1 in combination with a hollow housing and further characterized by this: that the ball-race member is made in sections each of which has formed therein at least one continuous ball raceway whereof the exterior face of its shallower straight portion bears against the interior face of the housing.

10. The bearing defined in claim 1 and further characterized by this: that the ball-race member is made in sections each of which has formed therein at least one complete continuous ball raceway having its shallower straight portion overlapped by an edge portion of one of the adjacent sections, and such overlapping edge portion in the case of each section being of such thickness that the radial distance from the axis of the bearing to the exterior faces of all the overlapping edge portions is uniform.

11. The bearing defined in claim 1 and further characterized by this: that the ball-race member and the sleeve are made in sections whereof each section comprises a sleeve portion and a portion integral therewith in which one of the continuous ball raceways is formed, said sections being so disposed relatively to each other that the ball raceway formed in one section overlaps the sleeve portion of an adjacent section.

JOHN B. THOMSON.

REFERENCES CITED

The following references are of record in the file of this patent:

UNITED STATES PATENTS

| Number | Name | Date |
|---|---|---|
| 640,397 | Merker | Jan. 2, 1900 |

FOREIGN PATENTS

| Number | Country | Date |
|---|---|---|
| 755,957 | France | 1933 |
| 304,229 | Italy | 1932 |
| 324,319 | Great Britain | 1930 |

Certificate of Correction

Patent No. 2,503,009 April 4, 1950

JOHN B. THOMSON

It is hereby certified that errors appear in the printed specification of the above numbered patent requiring correction as follows:

Column 1, line 13, for the word "the" before "high" read *this*; lines 15 and 16, for "bearign" read *bearing*; line 27, for "positive" read *position*; column 6, line 11, for "this the" read *that the*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*